United States Patent [19]

Telkes

[11] 4,034,736
[45] July 12, 1977

[54] SOLAR HEATING METHOD AND APPARATUS

[75] Inventor: Maria Telkes, Newark, Del.

[73] Assignee: The University of Delaware, Newark, Del.

[21] Appl. No.: 531,673

[22] Filed: Dec. 11, 1974

[51] Int. Cl.² .......................................... F24J 3/02
[52] U.S. Cl. ................................ 126/270; 237/1 A
[58] Field of Search ............ 126/270, 271; 237/1 A

[56] References Cited

U.S. PATENT DOCUMENTS

| | | | |
|---|---|---|---|
| 1,271,800 | 7/1918 | Sutton | 126/270 |
| 1,467,005 | 9/1923 | Lawrence | 126/271 |
| 2,030,350 | 2/1936 | Bremser | 126/271 |
| 2,288,465 | 6/1942 | Knudsen | 126/270 |
| 2,595,905 | 5/1952 | Telkes | 126/270 |
| 2,680,437 | 6/1954 | Miller | 126/270 |
| 2,857,634 | 10/1958 | Garbade et al. | 126/270 |
| 2,931,578 | 4/1960 | Thompson | 126/270 |
| 2,969,788 | 1/1961 | Newton | 126/271 |
| 3,863,621 | 2/1975 | Schoenfelder | 126/270 |
| 3,939,818 | 2/1976 | Hamilton et al. | 126/271 |
| 3,971,359 | 7/1976 | Bourne | 126/270 |

Primary Examiner—John J. Camby
Assistant Examiner—Henry C. Yuen
Attorney, Agent, or Firm—C. W. Mortenson

[57] ABSTRACT

A solar air heater is vertically disposed and composed of a plurality of parallel, horizontally disposed slats resembling a venetian blind. The slats are positioned with their upper faces facing the sun and at an acute angle relative to the horizontal such that the winter sun will produce multiple heat absorbing reflections between adjacent slat surfaces, whereas the summer sun will be reflected back, if desired, so as to impart little or no heat to the heater. Air is circulated through the heater between the slats, thereby becoming heated as it absorbs heat from the slats. This heated air is then sent into a structure, such as a room of a house, via air ducts or the like to heat the structure or is sent to such other areas as desired, the solar air heater being attached to or forming a part of the structure that is to receive the heat produced by its use.

30 Claims, 16 Drawing Figures

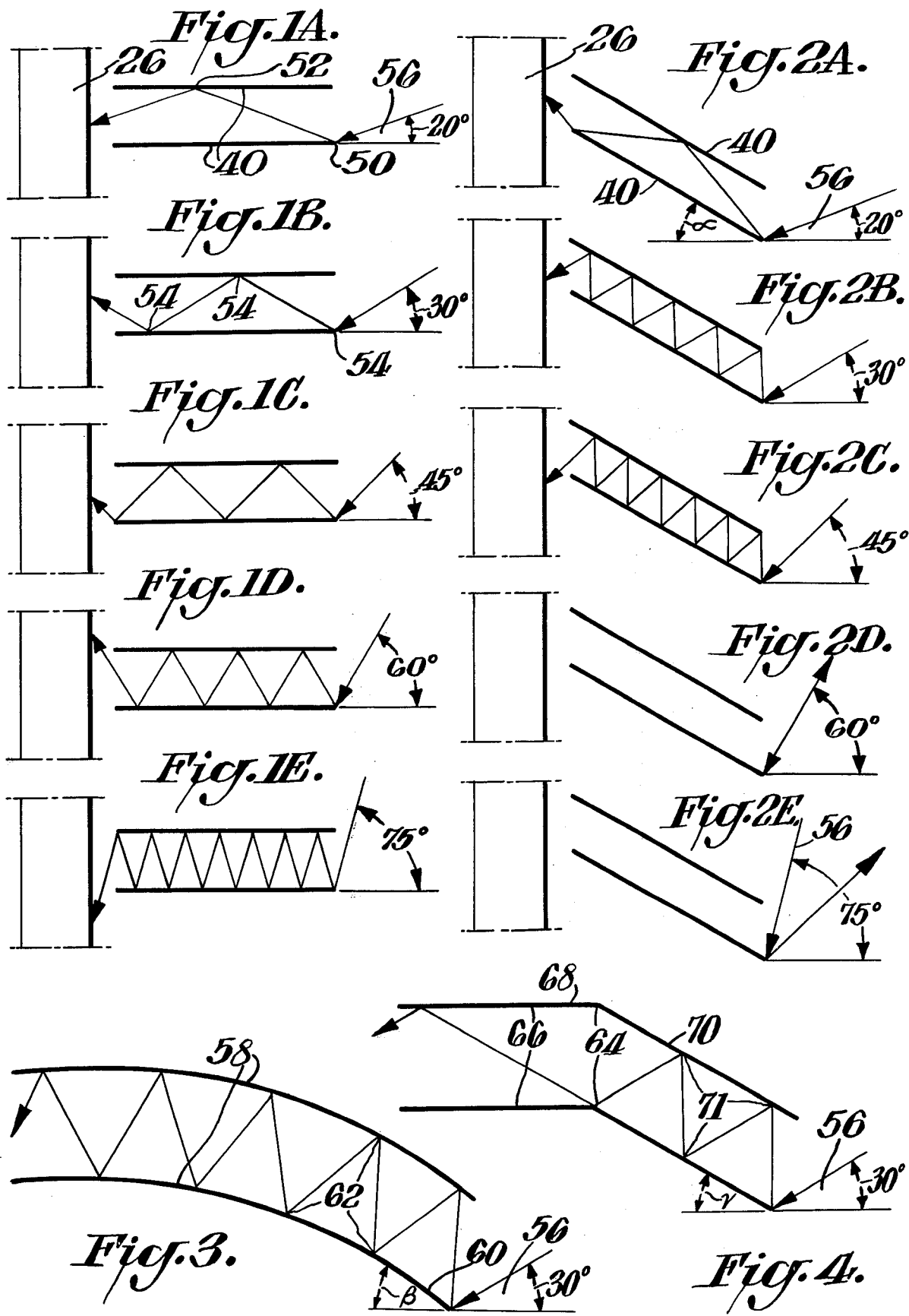

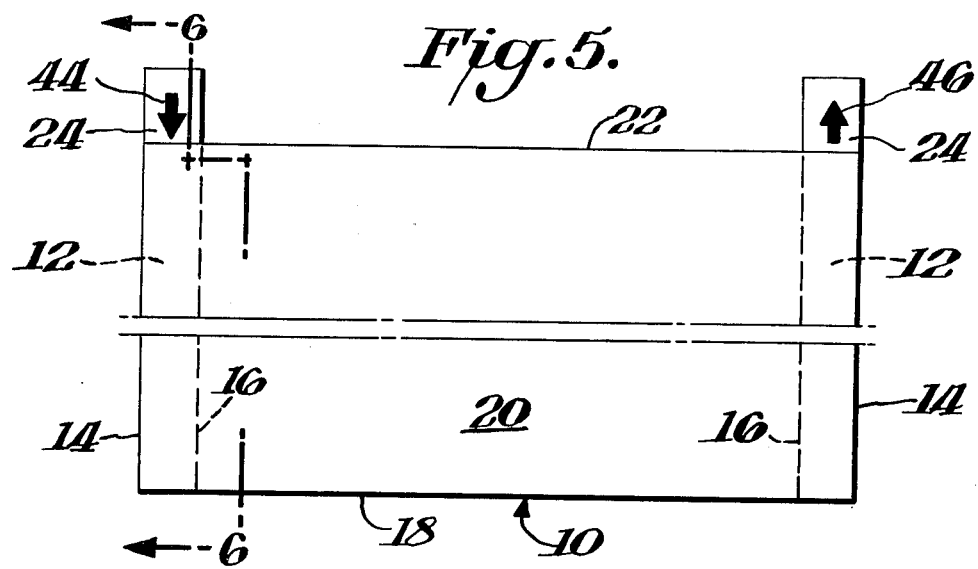
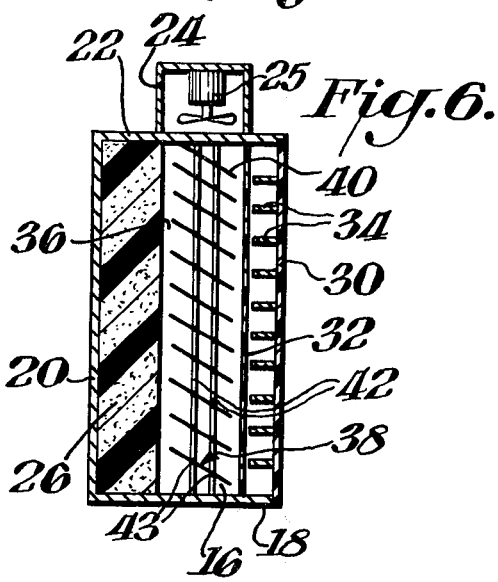
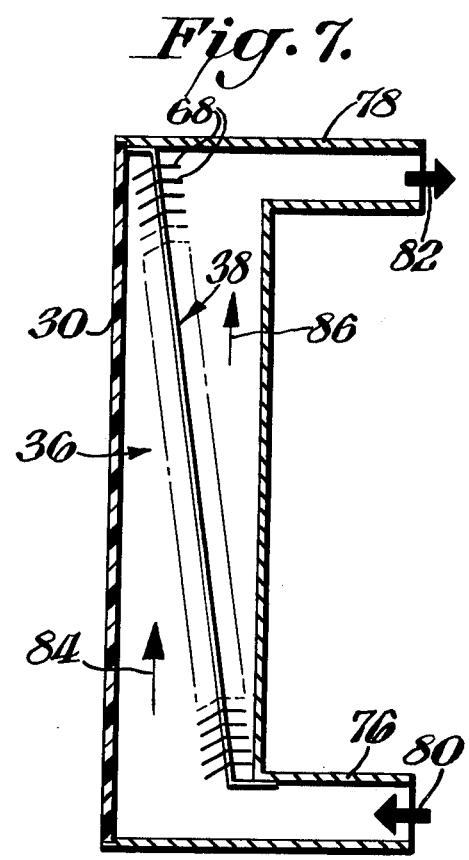
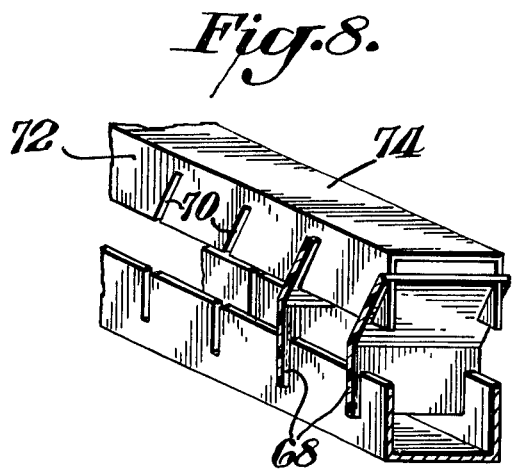

SOLAR HEATING METHOD AND APPARATUS

BACKGROUND OF THE INVENTION

This invention relates to solar air heating, and more particularly, to a method and apparatus for heating gases which selectively uses heat from the winter sun and rejects heat from the summer sun.

Solar air heaters have been known for many years. They usually have a transparent cover, a radiation absorbing surface and an insulating backing. Air is passed across the radiation absorbing surface which is heated by the sun. Typical of these solar air heaters are those described in an article entitled "Black-Painted Solar Air Heaters of Conventional Design" by Austin Whillier published on pages 31–37 of Solar Energy Vol. 8, No. 1, 1964.

Many efforts have been made to improve the efficiency of such heaters by providing selective black coatings on the radiation absorbing surface to reduce reradiation losses and by decreasing the heat losses through the transparent cover by the use of multiple glass covers. While many of these efforts have proven quite useful and, in fact, highly successful, the utilization of multiple covers simply tends to increase the cost of such heaters prohibitively. Further, the utilization of plural glass and plastic transparent covers also has a weight increasing factor.

A solar air heating system utilizing an absorber of highly polished sheet aluminum fins arranged in parallel is described by V. D. Bevill and H. Brandt, Solar Energy, Vol. 12 pp. 19–29 1968. According to Bevill et al the fins are disposed vertically - that is they were supported on their long edge being set in grooves in an aluminum base plate forming the bottom of a box horizontally positioned and having a horizontal glass cover. The solar radiation studied was at an angle of incidence less than 35°, the fins being in a fixed position. The solar radiation was reflected between adjacent highly polished fins and air was circulated between the fins. This system has proven highly desirable in many respects but has the unfortunate disadvantage of requiring an opaque cover or other shading mechanism particularly during the summer months in order to avoid unwanted and undesired heating to occur within the heater. Further, its efficiency was very sensitive to wind velocity, heat losses to ambient air being severe.

Accordingly, it is an object of this invention to obviate many of the disadvantages of the prior art solar heating apparatus.

Still another object of this invention is to obviate many of the disadvantages of prior art solar gas heating methods.

An additional object of this invention is to provide an improved solar gas heater utilizing generally horizontally disposed slats.

A still further object of this invention is to provide an improved method of absorbing and utilizing solar radiant energy using parallelly disposed heating slats.

BRIEF DESCRIPTION OF THE INVENTION

According to this invention a solar air heater is constructed having a housing defining an absorber chamber and a generally vertically disposed wall transparent to solar radiant energy, a radiant energy absorber means positioned inside the chamber generally parallel to said wall and having an assembly of generally horizontally and parallelly disposed slats adapted to absorb the radiant energy, the slats being positioned one above the other. Present also is a circulating means for passing air through the chamber and across said slats to be heated thereby. In a preferred form of the invention, one face of the slats faces the source of radiant energy (the sun) and the slats are inclined relative to the horizontal. The sun striking the exposed portion of the slats produces multiple reflections between adjoining slats, each reflection transferring additional radiant energy in the form of heat to adjacent slats.

In another preferred embodiment, the slats are curved across their width dimension. In still another embodiment the slats are bent along a longitudinal axis to define a slat having two planes. Both the bent slats and the curved slats are desirable for their additional strength and rigidity. The circulating means can direct the air longitudinally of the slats through the spacing between the several slats or transversely of the slats. The slats are positionable about their longitudinal axis to accommodate varying declination angles of the sun.

According to the method of this invention solar radiant energy is used by spacing slats that are adapted to absorb energy in a spatially stacked, generally vertically disposed array. The slats are generally parallelly positioned in the array such that at least a portion of the top face of each is exposed to the radiant energy and at least a part of the exposed portion is transverse to the direction of the energy. Multiple heat absorbing reflections thus occur between the top face of one slat and the bottom face of the next higher slat. As a final step, air is passed through the slats thereby to heat the air using the heated slats.

In a preferred method of this invention the exposed portion of said slats is positioned such that the angle of incidence of the energy thereon is less than 90°.

A particular advantage of the method and apparatus of this invention is that the winter sun is permitted entry into the spaces between the parallelly disposed slats to produce multiple reflections between adjacent slats. At each reflection, depending upon the material used, a certain percentage of the incoming energy is absorbed. Thus, with the multiple reflections, eventually a large portion of the incoming energy is received and absorbed for eventual transfer to the circulating air as heat energy which is passed across the slats. As the sun decreases its angle of declination with the oncoming of the summer months a point is reached, particularly if the slats are tilted downwardly to more fully face the sun, at which the incoming sunlight is reflected back into the sky such that little heat transfer to the slats occurs.

BRIEF DESCRIPTION OF THE DRAWINGS

The novel features that are considered characteristic of this invention are set forth with particularity in the appended claims. The invention, itself, however, both as to its organization and method as well as additional objects and advantages thereof will best be understood from the following description when read in connection with the accompanying drawings, in which:

FIGS. 1A through 1E are schematic representations of two of the horizontally disposed slats shown in FIG. 6, the schematic illustrating the effect of different sun inclination angles thereon in the ability of the slats to absorb heat energy;

FIGS. 2A through 2E are similar schematic representations in which parallel disposed reflecting slats are tilted into the sun depicting the manner in which winter sun inclinations permit the absorption of heat by the slats whereas summer sun inclinations tend to cause total reflection of the sun's energy;

FIG. 3 is a schematic representation of a cross-section of parallelly disposed, curved slats which have the feature of rejecting summer sunlight;

FIG. 4 is a schematic representation of a cross-section of parallelly disposed slats that are bent about a longitudinal axis which permits the rejection of summer sun's energy;

FIG. 5 is a pictorial elevation view of a solar air heater constructed in accordance with the preferred embodiment of this invention;

FIG. 6 is a cross-sectional view of the solar air heater illustrated in FIG. 5 taken along the section line 6—6;

FIG. 7 is a cross-sectional view of a solar air heater utilizing reflecting slats constructed in accordance with still another embodiment of this invention; and FIG. 8 is a pictorial representation depicting a method of construction by which the slats of the solar air heater of FIG. 7 may be mounted.

DESCRIPTION OF THE PREFERRED EMBODIMENT

The solar gas or air heater of this invention may perhaps best be understood by referring to FIGS. 5 and 6 first. These figures depict the construction of a solar air heater 10 in accordance with this invention, which is generally boxlike in shape to enclose a cavity or chamber 36 having a heat exchange unit 38 as will be described. The solar air heater has two end chambers or plenums 12 defined by end walls 14, which may be a wall or part of a wall of a house or other structure to be heated or may be of lightweight material lending portability to the device, and inner walls depicted by the dashed lines 16 which direct the air to and from the heat exchange unit 38. The heater has a bottom wall 18 and a back wall 20 along with a top wall 22. The various walls may be formed of any suitable rigid material such as metal or preferably hard-pressed asbestos, that is capable of withstanding the heat to which the unit is typically subjected (typically 200° F.) and is a poor heat conductor, with walls 14 and 20 being separate or integral.

Suitable ducts 24 provide access and egress from the plenum chambers 12. The exhaust duct (or the inlet duct) has a fan 25 which aids in circulating the air through the heat exchange unit 38. Thermal insulating material 26 is disposed against the back wall 20. This insulating material may be of any suitable type such as polyurethane foam, glass wool and the like which has low heat conductivity. The front of the solar air heater is covered by a transparent cover or window 30 which is transparent to the sun's radiant energy. This window 30 thus completes the enclosure of the heat exchange unit 38. In addition to the outer cover 30 there may be provided an inner separator 32 which is also transparent to the sun's radiant energy. Desirably this inner separator 32 and the window 30 should be resistive to thermal radiation, have a high resistance to heat and undergo no long term discoloration as a result of exposure to the sun's energy or heat. Among the suitable materials for this inner separator and/or window 30 are glass and polyvinyl fluoride film such as that sold under the registered trademark "TEDLAR" by E.I. DuPont deNemours Co., Wilmington, Delaware. Suitable transparent spacers 34 may be provided to maintain a space or separation between the window 30 and inner separator 32 and also to reduce the convection heat losses by the air circulating therein. These spacers 34 should not contact the inner separator 32 if heat conduction losses are to be avoided. Alternatively, the window and/or inner separator may be made of "PLEXIGLAS" (a registered trademark of Rohm and Haas Company) sheets, typically of a thickness less than one-sixteenth of an inch to reduce weight and costs. PLEXIGLAS is particularly suitable in that it is transparent to the sun's radiant energy and is relatively rugged. A particularly suitable material for this purpose may be that sold by Rohm & Haas Company of Germany under the trademark "ROHAGLASS". This material is an integral ribbed, double sheet structure that provides both the window 30 and inner separator 32 together with spacers 34.

The insulation 26 on the one hand, together with the inner separator 32 define an absorber chamber 36 in which the collector or radiant energy absorber 38 is disposed in a vertical array. The absorber 38 is constructed of a plurality of generally horizontally positioned slats 40 which are disposed in a stacked array with each slat being spaced vertically from its adjoining slats as by a pair of vertical spacer supports 42 which may be connected adjustably to the top and bottom walls 22 and 18, respectively. In the embodiment illustrated in FIG. 6, each slat 40 is rotatably connected at its ends, as by spaced pin and socket mountings 43 to each of the supports 42. By making one (or both) of the supports 42 movable or adjustable in a vertical sense and one fixed, the slats 40 are preferably tiltable about their longitudinal axes so as to vary their angle of inclination relative to the horizontal as will be described. Alternatively, the supports 42 may be fixed so that the slats 40 within the absorber chamber 36 are at a fixed angle relative to the horizon or sun.

In operation, the vertically disposed array 38 is attained by positioning the solar air heater 10 with the transparent window 30 facing the sun in the south (when in the northern hemisphere). The sun's radiant energy passes through the transparent window 30 and the transparent inner separator 32 and impinges upon the exposed portion (the front portion) of the several slats. This energy strikes the slats which preferably are constructed of a polished aluminum or other suitable material capable of radiant energy absorption which as a low infrared emissivity. Typically, the slats may be 2 inches in width and spaced vertically one-half to one inch apart. In any event, the ratio between the spacing between the slats' vertical spacing and the slats' width should be one to four or more. Aluminum is particularly preferred because of its infrared emissivity which is low and approximately 15% of the radiant energy of the sun striking it is absorbed on each incidence. The slats are inclined such that the radiant energy impinges on the top surface of a slat and is reflected up to the bottom surface of the next higher slat, thence down again and so on to provide multiple reflections. This radiant energy, by producing multiple reflections between adjoining slats 40, is absorbed by the slats and converted to heat. Air circulating downward through the inlet plenum chamber 24 as denoted by the arrow 44 and upward from the outlet plenum chamber 24 as denoted by the arrow 46, passes through the absorber chamber 36 between the slats along their longitudinal axis thereby extracting heat from the slats by convection such that the exit air is warmer.

At first glance, the heat exchange resembles the usual venetian blinds, but there are very essential differences.

The solar air heater's slats must be highly refective and preferably should not be coated with any color or coating, (except those few coatings which have total transparency for the long infrared radiation, such as certain silicone lacquers).

When regular venetian blinds transmit light for the purpose of absorbing the light inside the rooms, the slats of the blind must be turned to admit light from the sun between the slats. In solar air heaters, the slats are turned at an angle to the sun's rays, so that a high number of reflections occur between the slats. At each reflection some portion, typically 15%, of the sun's radiant energy becomes absorbed, heating the slats, so that these become heated near their exterior surface and do not have to rely on thermal conductivity in the aluminum body of the slats. In this way, the slats can be made of very thin aluminum decreasing the weight (and cost) of the solar air heater.

The end profile of the slats can be bent, curved, or it could have multiple stiffening bends which have surfaces designed to facilitate multiple reflections. The slats can be formed of rather thin sheet aluminum of sufficient rigidity to support the length of the slat. This rigidity can be increased by the bent or curved end profile. In this way the solar heat collector can be made much lighter in weight, saving material and costs.

The degree of energy absorbed by the slats will be a function of their positioning relative to the sun as noted. This effect may be more easily understood by reference to FIGS. 1A through 1E. In FIGS. 1A through 1E the slats 40 are depicted as being horizontally disposed in front of the insulating material 26. In FIG. 1A with the winter sun in an extreme north latitude having an angle of inclination of 20°, the sun's radiant energy will reflect upon the lower plate 40 at the point 50 thence upwardly, reflecting off the bottom surface of the upper plate 40 at the point 52 thence to the insulation 26. With the first incident reflection, using polished aluminum, roughly 15% of the radiant energy is absorbed. With the second incident at the point 52, another 15% of the remaining energy, i.e., 15% of 85% of the sun's radiant energy is absorbed. This heat energy is temporarily stored in the plates and transferred as described to the circulating air.

As may be seen in FIG. 1B, if the winter sun is at the inclination of 30°, which is a typical angle for the winter sun at noon for latitude north 40°, with the slats having the 1:4 ratio noted between spacing and width, three reflections denoted by the points 54 will occur. Thus, an additional amount of energy may be seen to be absorbed. As the sun's angle of inclination increases to say 45° as is depicted in FIG. 1C and then to 60° in FIG. 1D a still greater number of multiple reflections occur, so that still more heat energy is absorbed using the horizontally disposed plates. With the typical summer sun, 75° inclination at 40° north latitude, a very large number of reflections occur so that the degree of heat absorbed is quite high. While this may not be necessary or desirable in the case of summer sun, the horizontally disposed plates are a relatively stable configuration.

It must be remembered that the increased number of reflections makes up for the fact that as the angle of the sun's inclination increases, a smaller portion of the sun's radiant energy due to the sun's relationship actually impinges upon the vertical face of the solar air heater. Thus, the greater number of multiple reflections makes up for this loss so that the solar air heater becomes more efficient with the increase in the sun's inclination to make up for what would otherwise be a heat reduction. This obviates the necessity for relatively expensive servo systems such that the solar air heater may follow the sun and be at an optimal position thereto at all times.

In accordance with another embodiment of this invention, the slats 40 of FIG. 6 making up the heat exchange unit may be mounted at a fixed angle of inclination $\alpha$ or adjusted to such inclination by the movable support arrangement 42. A slat angle of inclination of $\alpha = 30°$ is depicted in FIGS. 2A through 2E, inclusive. This has the unique advantage in that an increased number of reflections occur when the angle of the sun's inclination, as depicted by the vector 56, is 20° by the resulting increase in number of reflections on the top and bottom surfaces of the adjoining slats 40 over that which occurs with the same sun inclination with the horizontally disposed slats. As may be seen in the several figures, the number of reflections increases as the sun's angle of inclination increases thereby compensating, as previously described, for the decreased radiation striking the vertical face of the solar air heater. A point is reached (FIG. 2D) when the sun's inclination reaches 60° such that the sun is no longer able to be reflected into the void or space between the slats 40 and, instead, is reflected directly back. As the inclination increases still further, as depicted by the vector 56 in FIG. 2E, to 75° (typical summer sun), the solar energy is, in fact, reflected away from the solar air heater. Thus, during the extreme heat of the summer when in all probability the solar air heater is not normally used, it is not unduly burdened by unwanted heat energy being absorbed therein.

The adjustable feature, which is depicted in FIG. 6, is particularly advantageous since the angle of inclination of the slats may be adjusted to optimize the heating effect for any given angle of sun inclination. All the while, the heat absorber is vertically positioned as against the side wall of a house or building. Thus, no special design is needed to accommodate the solar air heater.

Still another embodiment of this invention is illustrated in FIG. 3 in which the slats are depicted as having a curved cross-section 58 along their width dimension. These curved slats 58 are substantially parallel to each other and the outer or edge portion 60, which forms the front or exposed edge or side of the vertically disposed array, is inclined relative to the horizontal at an angle beta. This angle beta may be varied utilizing the adjustable mounting supports 42 depicted in FIG. 6. As may be seen, with this 30° inclination, multiple reflections 62 occur between adjacent top and bottom faces of adjoining slats 58. The array still has the ability to reject summer sun and is strengthened by the curvature.

In still another form of the invention the slats may be formed to have a bend 64 along their longitudinal axis such that the slats 66 have two planar portions 68 and 70 each lying in different intersecting planes. These slats 66 with the longitudinal bend thereby simulate the curved slats 58 of FIG. 3. These slats may have an inclination angle which may be varied. This angle is depicted by the greek symbol gamma ($\gamma$). Thus, with a sun inclination of say 30° it is again seen that multiple reflections 71 occur between the inner adjoining faces of adjoining plates. In fact, the operation is quite similar to that described in conjunction with the embodiment of FIG. 3.

These slats having the longitudinal bend may be fixedly secured within the absorbing chamber 36 by utilizing the channel-type fixed mountings as depicted in FIG. 8 instead of the adjustable mounting. As seen in FIG. 8, the slats 68 are introduced into slots 70 formed in the uprights 72 of U-shaped metal channels 74. By selecting the angle of the longitudinal bend to be slightly different than that of the angle of the slot 70, a friction fit may be produced such that the slots may be secured by friction and no welding or other means of securing the slots in position is required, although these other means may be used if desired. The friction or interference fit is preferred as cheaper and facilitating slat replacement.

Another alternative embodiment of this invention is depicted in FIG. 7. In this instance the slats are depicted purely by way of illustration as having a bend along their longitudinal axis. It is to be understood, of course, that any of the other configured slots, either planar, curved, having multiple longitudinal bends, or otherwise as is described hereinbefore, may be employed. In this instance, the heat absorbing chamber 36 is constructed similarly to the chamber previously described in connection with FIG. 6 with suitable insulation at the rear portion thereof. The transparent face wall 30 through which the sun's radiant energy enters is depicted as a single face wall for simiplicity of illustration. In this instance, the slats 68 are formed in a vertical array an positioned such that the top of the array 38 is tilted forwardly toward the transparent cover 30. Air is circulated into the chamber from the bottom through a suitable duct 76 and outwardly at the top through a second duct 78 as depicted by the respective arrows 80 and 82. The ducts 80 and 82 encompass the entire horizontal width of the heat absorbing chamber 36 such that the air moves upwardly within the heat absorbing chamber as depicted by the arrow 84 and thence flows back across the width of the slats 68, to continue its upward journey at the back portion of the heat absorbing chamber, as depicted by the arrow 86, thence out through the exhaust duct 78. This flow pattern has one advantage over that depicted in FIG. 6 in that the flow resistance is somewhat less. Here again, although the fixed positioned slats 68 are illustrated, it is preferred that adjustable slats mounted in a manner similar to that in FIG. 6 be used.

Thus, according to the method of this invention and utilizing the apparatus of FIG. 7, the inlet air to be heated moves upwardly, thence backwardly across the width of the slats thereby removing the heat from the slats by convection, thence upwardly and out from the heat exchange chamber. A desirable feature of this method is that the vertical array of slats be tilted forwardly to facilitate this type of air flow. Slats having a flat, curved, or angular cross-section may be used.

There has thus been described a rather unique apparatus and method for solar air heating. This method utilizes multiple reflections from the surfaces of horizontal slats disposed in a vertical array and has a particular advantage in that by proper angular positioning of the slats the summer sun's heat may be rejected from the heater.

It is obvious that many embodiments may be made of this inventive concept, and that many modifications may be made in the embodiments hereinbefore described. Therefore, it is to be understood that all descriptive material herein is to be interpreted merely as illustrative, exemplary and not in a limited sense. It is intended that various modifications, which might readily suggest themselves to those skilled in the art, be covered by the following claims, as far as the prior art permits.

What is claimed is:

1. A solar air heater comprising, in combination:
    a housing defining an absorber chamber,
    said housing having a generally vertically disposed wall transparent to solar radiant energy,
    a solar radiant energy absorber means being positioned in said chamber and having a spaced, stacked array of a plurality of generally horizontally and parallely disposed slats adapted to absorb said solar radiant energy, said stack of slats being generally vertical one above the other, each of said slats having a highly reflective top surface and a highly reflective bottom surface; thereby to effect multiple reflections of said solar radiant energy between adjoining slats in a back and forth manner, each reflection transferring additional solar radiant energy in the form of heat and light to a respective adjacent slat, and
    circulating means for passing air through said chamber in contact with said slats, thereby to be heated by said slats.

2. An apparatus according to claim 1 wherein said slats are polished aluminum.

3. An apparatus according to claim 1 wherein said slats are inclined away from said wall along their width dimension relative to the horizontal.

4. An apparatus according to claim 3 wherein the angle of inclination of said slats is approximately 30°.

5. An apparatus according to claim 1 wherein each of said slats define a curve across their width dimension.

6. An apparatus according to claim 5 wherein said slats have a width dimension that exceeds the spacing between slats.

7. An apparatus according to claim 3 wherein said slats are inclined away from said wall along their width dimension relative to the horizontal.

8. An apparatus according to claim 1 wherein said slats have a bend along their longitudinal axis which defines the slat by two different planes.

9. An apparatus according to claim 5 wherein said slats have a bend along their longitudinal axis which defines the slat by two different planes.

10. An apparatus according to claim 9 wherein at least the portion of said slats exposed to said solar radiant energy is inclined relative to the horizontal.

11. An apparatus according to claim 1 wherein said slats are adjustably mounted to be inclined along their width dimension relative to said horizontal in varying degrees.

12. An apparatus according to claim 5 wherein said slats are adjustably mounted to be inclined along their width dimension relative to said horizontal in varying degrees.

13. An apparatus according to claim 8 wherein said slats are adjustably mounted to be inclined along their width dimension relative to said horizontal in varying degrees.

14. An apparatus according to claim 1 wherein said circulating means directs said air longitudinally of said slats.

15. An apparatus according to claim 1 wherein said circulating means directs said air transversely of said slats.

16. An apparatus according to claim 14 wherein said stacked array is disposed aparallel of said wall with the upper portion of said array closer to said wall than the bottom portion of said array.

17. An apparatus according to claim 5 wherein said circulating means directs said air transversely of said slats.

18. An apparatus according to claim 8 wherein said circulating means directs said air transversely of said slats.

19. An apparatus in accordance with claim 1 in combination with a structure which is to receive the resultant heated air in which said combination the said heater and said structure have a common wall.

20. A solar air heater comprising, in combination:
a housing defining an absorber chamber,
said housing having a generally vertically disposed wall transparent to solar radiant energy,
a plurality of slats parallel to each other in an assembly that lies in a plane generally parallel to said wall, said slats being adapted to be heated by solar radiant energy and said slats being generally vertical one above the other, each of said slats having a highly reflective top surface and a highly reflective bottom surface thereby to effect multiple reflections of said solar radiant energy in a back and forth manner between adjacent slats, each reflection transferring additional radiant energy in the form of heat and light to a respective adjacent slat, and
circulating means for passing air across said slats, thereby to be heated by said slats.

21. An apparatus according to claim 20 wherein each of said slats are supported at their ends at two points, and means to vary the support positions thereby to incline said slats relative to said radiant energy.

22. An apparatus in accordance with claim 20 in combination with a structure which is to receive the resultant heated air.

23. An apparatus in accordance with claim 20, in combination with a structure which is to receive the resultant heated air, the said structure and the said solar air heater having a common wall.

24. A method of absorbing and utilizing solar radiant energy using slats adapted to absorb said energy comprising:
spacing said slats in a stacked, generally vertically disposed array,
parallelly positioning said slats in said array such that at least a portion of the top reflective face of each slat is exposed to said energy, and at least a portion of said exposed portion is transverse to the direction of said energy, said positioning being such that the sun's striking exposed proportions of slats produces multiple relfections in a back and forth manner between adjoining slats, each reflection transferring additional solar radiant energy in the form of heat and light to adjacent slats, the bottom surfaces of said slats which are reflective, and
passing air across said slats, thereby to heat said air.

25. A method according to claim 24 which includes the step of positioning said exposed portion of said slats such that the angle of incidence of said energy thereon is less than 90°.

26. A method according to claim 25 wherein the said positioning is effected so that said exposed portion of said slats defines an acute angle of less than 45° with the horizontal.

27. A method according to claim 24 wherein the said positioning of said slats is effected so that said slats are positioned generally horizontally.

28. A method according to claim 27 wherein the step of positioning said exposed portion to said slats such that the angle of incidence of said energy thereon is less than 90°.

29. A method according to claim 28 wherein said positioning of said slats is effected so that said slats define a constant curve across their width dimension.

30. A method in accordance with claim 24 which includes the step of mounting the said slats on a wall of a structure which is to receive the resultant heated air.

* * * * *